July 11, 1944.                L. D. KESLAR                2,353,473
                    PROCESS OF MAKING LAMINATED GLASS
                        Filed Nov. 5, 1940          2 Sheets-Sheet 1

Inventor
L. D. KESLAR
By Olen E. Bee
Attorney

July 11, 1944.  L. D. KESLAR  2,353,473
PROCESS OF MAKING LAMINATED GLASS
Filed Nov. 5, 1940  2 Sheets-Sheet 2
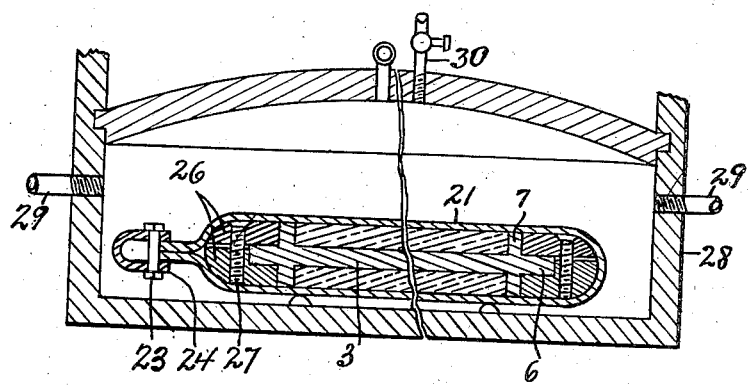
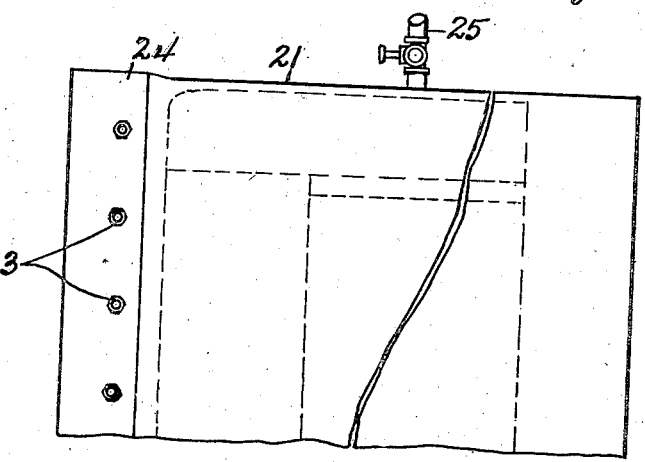
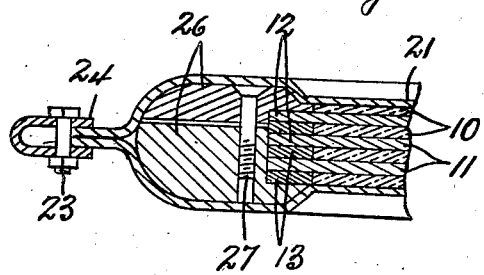
Inventor
L. D. KESLER
By
Olen E. Bee
Attorney Patented July 11, 1944

2,353,473

UNITED STATES PATENT OFFICE 2,353,473

PROCESS OF MAKING LAMINATED GLASS

Leroy D. Keslar, Tarentum, Pa., assignor to Pittsburgh Plate Glass Company, Allegheny County, Pa., a corporation of Pennsylvania Application November 5, 1940, Serial No. 364,437

1 Claim. (Cl. 154—2.74)

The present invention relates to safety glass and more particularly to laminated glass in which the reinforcing plastic interlayer extends beyond the covering glass plates to form a border therefor, and to the processes of manufacture of such glass.

An object of the present invention is to provide a laminated safety glass having a border of plastic material projecting therefrom.

Other objects and advantages of the invention will be more apparent from the following detailed description of certain preferred embodiments thereof.

Safety glass comprising a plurality of glass plates bonded together into a composite unit by interposed layers of plastic material is well known. The recent trend of streamlining, however, has raised several new problems of positioning safety glass in order that it will lie substantially flush with the surface of the vehicle being glazed. Where the plate of safety glass is mounted in a frame, which in turn is secured to the supporting structure, it will at once be obvious that there will be a projection extending beyond the surface of the vehicle or the glass panel will be recessed in the surface. In either event, the air stream passing over the glazed portion of a vehicle will be disturbed and will result in an increased air resistance and accompanying loss of efficiency.

Another problem which confronts the engineers and designers arises from the desire to improve on rigid structures and to provide a certain amount of flexibility therein. When the glass laminae are supported in a frame, flexing or movement of the supporting structure places an undue strain upon the glass, with the result that considerable breakage of the glass is experienced.

Briefly stated, the present invention contemplates the formation of a laminated glass bordered by plastic material which is to be positioned in a supporting structure through the plastic border. In this manner, the laminated unit will "float" in the vehicle walls and the possibility of breakage of the glass laminae thereof will be materially reduced.

In the drawing, Figure 1 is a plan view of a laminated unit constructed in accordance with the provisions of my invention.

Figure 6:
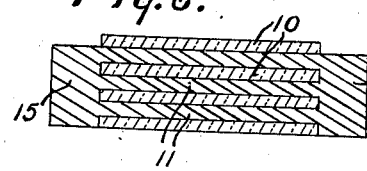

Figure 6 is a vertical sectional view of a completed multiplate laminated glass. Fig. 7 is a fragmentary cross section of an assembly of laminated unit, frames and bag in a heating chamber; Fig. 8 is a fragmentary plan of a bag adapted to contain the assembled unit; and Fig. 9 is a fragmentary cross section of a multiple plate laminated unit with frames and bag applied thereto.

Figure 1:
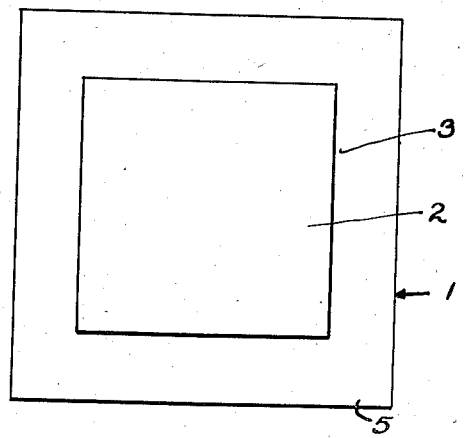
Figure 2:
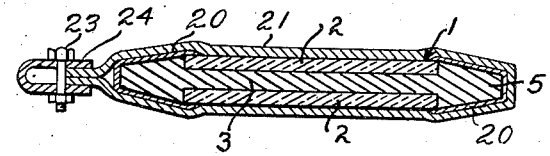
Figure 2 is a vertical sectional view thereof.

Referring to Figures 1 and 2 of the drawing, a laminated unit 1 comprises glass plates 2 adhered centrally on the opposite sides of a sheet 3 of plastic material of larger dimension than the glass plates and in such manner that a border 5 of the plastic material is formed around the perimeters of the glass plates. The interlayer sheet 3 of plastic material is of greater thickness than that ordinarily used in the preparation of safety glass and the glass plates may be said to be embedded therein for the plastic material envelopes the edges of the glass plates. According to Fig. 2 the border 5 is so formed that it decreases in thickness outwardly from the edges of the glass plates.

Figure 3:
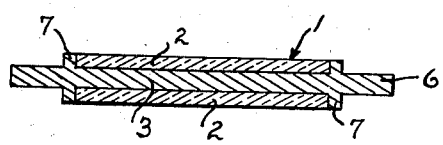
Figure 3 is a vertical sectional view of another form of the invention.

In the form of the invention illustrated in Figure 3, the plastic interlayer sheet 3 forms a border 6 around the edges of the glass plates 2, and has continuous shoulders 7 extending at right angles to opposite sides of the glass and in contact with the edges of the glass plates.

Figure 4:
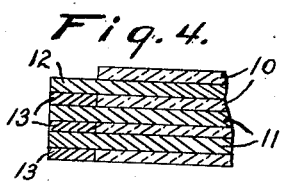
Figures 4 and 5 are fragmentary sectional views of multiplate laminate glass at an intermediate stage of manufacture.
Figure 5:
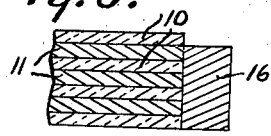

As shown in Figures 4, 5 and 6, it is possible to apply the principles of my invention to multiplate laminated glass. A plurality of glass plates 10 are united by intermediate layers 11 of plastic material which extend beyond the edges of the plates 10 to form lips 12. The spaces between the lips 12 are filled by strips 13 of plastic and the several parts of extended plastic form a border 15 (Figure 6) around the assembly. The border 15 may be supplied by the addition of strips or blocks 16 (Figure 5) of plastic to the assembly of glass plates 10 and intermediate layers 11 of plastic.

In positioning the laminated units in a vehicle, suitable securing means, such as bolts, are passed through the plastic borders of the plates at spaced intervals and fastened to the vehicle frame. It is intended that the glass laminae be kept free from metallic contact to reduce any possibility of strains or local stresses therein. Thus the plastic borders 5, 6, 12—13 and 15 in effect constitute flexible mounting flanges which are adapted to be clamped tightly for supporting the unit without imposing strains or stresses upon the glass plates.

A laminated unit as contemplated by my invention is produced by assembling a plurality of glass plates and interposed sheets of plastic material of larger dimensions. The exposed areas of the plastic material are masked by a nonadhesive substance 20, as for example, a sheet of Cellophane, or other inert masking material, and the assembly is placed in a rubber bag 21. Suitable closure elements 23 and 24 are included with the bag to confine the laminated unit therein. The bag is evacuated through a conduit 25 and subjected to heat and pressure sufficient to bond the separate elements of the assembly into a composite unit. It is during the heating and pressing operation that the plastic border 5 (Fig. 2) assumes its tapered form.

A laminated unit as illustrated in Figure 3 is obtained by placing molding frames 26 around the assembled plates and plastic in which the projecting areas of the plastic material are masked, before the assembly is subjected to heat and pressure. The molding frames, assembled by bolting the elements thereof together, as indicated at 27, are larger than the glass plates and are spaced slightly outwardly therefrom, in order that during the laminating operation the plastic material will flow into the space between the glass edges and frames and form the shoulders 7. Heat and pressure are applied to the assembly of laminated unit, frames, and bag in a chamber 28, in which the heat and pressure are controlled in a conventional manner through conduits 29 and 30 that are included in the walls of the chamber.

The plastic bordered plate may also be prepared by assembling a plurality of glass plates and interposed plastic sheets of larger dimensions and filling the spaces between the projecting lips of plastic with strips of plastic. Heat and pressure are then applied to the assembly to bond the several elements thereof into a composite unit. The laminating operation welds the several layers of plastic lying to the outside of the glass laminae into a uniform mass forming the desired border for the laminated plate.

Consideration has been given to the fact that difficulties will be experienced in assembling multiplate units and aligning properly the glass laminae when the interposed plastic sheets are of greater dimensions than the glass. It is possible to assemble the glass and plastic in the ordinary manner and position plastic strips of suitable thickness and width about the assembly. Subsequent lamination under heat and pressure will not only unite the glass and plastic interlayers but will also join the plastic strips to the interlayers to form an integral projecting border.

Manifestly it is necessary that the plastic material forming the interlayer of the laminated glass be susceptible to flow when heat and pressure are applied thereto. At the same time too much plasticity will weaken the final structure. The vinyl acetal resins and particularly vinyl butyral are preferred. At the same time, however, the acrylate resins and other thermoplastic resins ordinarily used in safety glass may be employed if desired. It is also possible to use a composite interlayer wherein a central stratum of a hard resin is covered with softer thermoplastic materials. This type of interlayer will insure greater strength in the projecting borders of the unit. The lamination operation follows the standard practices so well known that it is not considered necessary to set them forth in great detail. Obviously the pressure and temperature to which the assembled units are subjected will vary with the types of plastic materials utilized.

It will at once be obvious that various modifications in the types of materials employed and their arrangement are possible without departing from the spirit of the invention or the scope of the appended claim.

What I claim is:

A process of manufacturing safety glass which comprises assembling a plurality of glass plates and interposed sheets of plastic material of larger dimensions, masking the exposed areas of the plastic material, applying molding frames to each side of the assembly in spaced relation to the edges of the glass plates, placing the assembly in a rubber bag, evacuating the bag and subjecting the assembly to controlled heat and pressure to bond the separate elements thereof into a composite unit.

LEROY D. KESLAR.